United States Patent [19]

Probst et al.

[11] 4,442,145

[45] Apr. 10, 1984

[54] PROCESS FOR COATING SUBSTRATES WITH POLYISOCYANATES AND POLYHYDROXY POLYACRYLATES

[75] Inventors: Joachim Probst; Bernd Riberi, both of Cologne, Fed. Rep. of Germany; Günter Kolb, deceased, late of Leverkusen, Fed. Rep. of Germany, by Ingeborg Kolb, heiress; Peter Höhlein, Kempen, Fed. Rep. of Germany

[73] Assignee: Bayer Aktiengesellschaft, Leverkusen, Fed. Rep. of Germany

[21] Appl. No.: 393,224

[22] Filed: Jun. 28, 1982

[30] Foreign Application Priority Data

Jun. 30, 1981 [DE] Fed. Rep. of Germany ....... 3125569

[51] Int. Cl.³ .............................................. B05D 3/02
[52] U.S. Cl. ............................... 427/385.5; 427/388.2; 427/389.7; 427/389.9; 427/391; 427/393; 427/393.5; 427/393.6; 525/124; 525/127; 525/328.8; 525/374
[58] Field of Search ............... 427/385.5, 393.5, 388.2, 427/393, 393.6, 389.7, 389.9, 391; 525/123, 124, 127, 328.8, 374

[56] References Cited

U.S. PATENT DOCUMENTS

| | | | |
|---|---|---|---|
| 3,002,959 | 10/1961 | Hicks | 260/88.1 |
| 3,375,227 | 3/1968 | Hicks | 260/47 |
| 3,632,789 | 1/1972 | Wilhelm et al. | 260/33.6 |
| 3,853,822 | 12/1974 | Brod et al. | 260/77.5 |
| 4,064,194 | 12/1977 | Evans et al. | 427/385.5 X |
| 4,169,825 | 10/1979 | Yapp et al. | 427/385.5 X |
| 4,252,923 | 2/1981 | König et al. | 525/452 |
| 4,289,813 | 9/1981 | Blomeyer et al. | 427/385.5 |

FOREIGN PATENT DOCUMENTS 1515868 6/1978 United Kingdom .

*Primary Examiner*—Thurman K. Page
*Attorney, Agent, or Firm*—Gene Harsh; Joseph C. Gil; Thomas W. Roy

[57] ABSTRACT

The invention relates to a process for the production of coatings using a coating composition containing as binder optionally blocked lacquer-grade polyisocyanates in combination with polyhydroxy polyacrylate resins based on copolymers of certain hydroxy alkyl(-meth)acrylates, methyl methacrylate, 2-ethylhexyl acrylate and, optionally, (meth)acrylic acid, wherein the molecular weight is in the range from about 30,000 to 80,000, the content of low molecular weight constituents having molecular weights of at most about 3000 amounts to between 3 and 15% by weight, the molecular heterogeneity factor amounts to between about 1.0 and 10.0, and the parameter for the chemical heterogeneity of the copolymer is between 0 and about 0.06.

10 Claims, No Drawings

PROCESS FOR COATING SUBSTRATES WITH POLYISOCYANATES AND POLYHYDROXY POLYACRYLATES

BACKGROUND OF THE INVENTION

1. Field of the Invention

This invention relates to a process for the production of coatings using coating compositions containing as binder highly compatible and readily pigmentable mixtures of lacquer-grade polyisocyanates with selected polyhydroxy polyacrylates.

2. Description of the Prior Art

German Offenlegungsschrift No. 2,460,329 and British Pat. No. 1,515,868 describe a process for the production of low molecular weight acrylate resins, i.e. acrylate resins having a molecular weight of from about 500 to 2000, which are obtained by radical copolymerization in bulk or in an organic solvent or solvent mixture at temperatures in the range from 80° to 120° C. In conjunction with certain diisocyanates and polyisocyanates, the acrylate resins in question, which consist of from 10 to 50 parts by weight of a hydroxy alkyl ester of acrylic acid or methacrylic acid, from 0 to 80 parts by weight of styrene or derivatives thereof, from 10 to 90 parts by weight of a (meth)acrylic acid ester containing from 1 to 12 carbon atoms in the alcohol radical and from 0 to 50 parts by weight of an $\alpha,\beta$-monoolefinically unsaturated monocarboxylic or dicarboxylic acid containing from 3 to 5 carbon atoms, give lacquers which are suitable for two-component lacquering. However, one disadvantage of the resins in question is that, in some cases, they show poor compatibility with a number of polyisocyanates which may be reflected both in clouding of the mixed solution when the two components of the lacquer are combined with one another and also in clouding of the dried, hardened lacquer film. In most cases, the resins also show relatively poor compatibility with a number of cellulose derivatives of the type often added to the lacquers as levelling agents or as an additional lacquer component.

Another serious disadvantage of the lacquer mixtures in question lies in their generally poor pigment wetability. Accordingly, pigmented, hardened lacquer films on this basis generally show very little gloss, if any, and lack uniformity in their appearance on account of the irregular distribution of the pigment particles.

U.S. Pat. Nos. 3,002,959 and 3,375,227 and German Auslegeschrift No. 1,038,754 also describe polyacrylate resins containing hydroxyl groups and processes for their production. The polyacrylate resins in question may be hardened with crosslinking agents, including diisocyanates, to form lacquer layers. There are no concrete references in any of these patents as to how the difficulties referred to above can be obviated, particularly where higher than difunctional polyisocyanates containing biuret, urethane or isocyanurate groups are used as crosslinking agents.

Accordingly, the object of the present invention is to provide a new process for the production of coatings using binders based on lacquer-grade polyisocyanates and polyacrylate resins containing hydroxyl groups which are not attended by any of the disadvantages referred to above. This object is achieved by the process according to the invention which is described in detail in the following.

SUMMARY OF THE INVENTION

The present invention relates to a process for the production of a coating which comprises
(A) coating a substrate with a coating composition which contains as binder a mixture comprising
   (a) a lacquer-grade polyisocyanate-containing biuret, urethane or isocyanurate groups and
   (b) a polyhydroxy polyacrylate resin based on a copolymer comprising
      (i) about 10 to 20 parts by weight of 2-hydroxyethyl(meth)-acrylate, 2- or 3-hydroxypropyl(meth)acrylate and/or hydroxybutyl(meth)acrylate,
      (ii) about 55 to 80 parts by weight of methyl methacrylate,
      (iii) about 8 to 30 parts by weight of 2-ethylhexyl acrylate and
      (iv) up to about 2 parts by weight of (meth) acrylic acid,
wherein the polyhydroxy acrylate resin is further characterized by
   (1) an average molecular weight as determined by gel permeation chromatography, $M_{GPC}$, of about 30,000 to 80,000,
   (2) about 3 to 15% by weight, based on the total weight of the copolymer, of low molecular weight constituents having molecular weights of at most about 3,000,
   (3) a molecular heterogeneity factor, $U = Mw/Mn - 1$, of between about 1.0 and 10.0, and
   (4) a chemical heterogeneity parameter $\delta_i$ for the copolymer of between 0 and about 0.06, and
(B) hardening the coating composition to form a polyurethane.

DETAILED DESCRIPTION OF THE INVENTION

The binder component (a) used in the process according to the invention is formed by lacquer-grade polyisocyanates, i.e. polyisocyanates containing in particular biuret, urethane or isocyanurate groups and having an average NCO-functionality of more than 2 and preferably from about 2.5 to 6. These polyisocyanates preferably contain aromatically, cycloaliphatically or aliphatically bound isocyanate groups. It is preferred to use polyisocyanates containing aliphatically and/or cycloaliphatically bound isocyanate groups for light-stable coatings. The lacquer-grade polyisocyanates used in accordance with the invention are obtained by modifying simple organic diisocyanates in known manner to introduce biuret, urethane or isocyanurate groups, any excesses of unmodified monomeric starting isocyanate still present after the modifying reaction being removed in known manner, preferably by distillation, to an extent such that the lacquer-grade polyisocyanates used in accordance with the invention contain at most about 0.7% by weight and preferably about 0.5% by weight of excess diisocyanate. The lacquer-grade polyisocyanates used in accordance with the invention generally have an NCO-content, based on solids, of from about 10 to 30% by weight.

Suitable diisocyanates for producing the lacquer-grade polyisocyanates are, for example, 2,4- and/or 2,6-diisocyanatotoluene, 2,4'-diisocyanato-dicyclohexyl methane, 4,4'-diisocyanato-dicyclohexyl methane, hexamethylene diisocyanate or 1-isocyanato-3,3,5-trimethyl-5-isocyanatomethyl cyclohexane (isophorone diisocyanate or IPDI). 2,4-diisocyanatotoluene, hexamethylene diisocyanate and IPDI are the preferred diisocyanates for producing the lacquer-grade polyisocyanates used in accordance with the invention. The lacquer-grade polyisocyanates are produced from the starting diisocyanates mentioned by way of example using known methods. For example, lacquer-grade polyisocyanates containing biuret groups may be produced by any of the processes described in U.S. Pat. Nos. 3,124,605; 3,358,010; 3,903,126; 3,903,127 or 3,976,622. Urethane polyisocyanates suitable for use in accordance with the invention are produced for example in accordance with U.S. Pat. No. 3,183,112, while lacquer-grade polyisocyanates containing isocyanurate groups suitable for use in accordance with the invention are produced for example by the processes described in British Pat. Nos. 1,060,430; 1,234,972; 1,506,373 and 1,458,564 or in U.S. Pat. Nos. 3,394,111; 3,645,979 or 3,919,218.

Particularly preferred lacquer-grade polyisocyanates are the biuret polyisocyanates produced according to U.S. Pat. No. 3,124,605, particularly those based on hexamethylene diisocyanate, the polyisocyanates containing urethane groups according to U.S. Pat. No. 3,183,112, particularly those based on 2,4-diisocyanatotoluene, trimethylol propane and various butane diols and the known polyisocyanates containing isocyanurate groups based on 2,4-diisocyanatotoluene, hexamethylene diisocyanate, IPDI, mixtures of 2,4-diisocyanatotoluene with hexamethylene diisocyanate or mixtures of hexamethylene diisocyanate with IPDI.

The binder component (b) according to the invention is formed by polyhydroxyl polyacrylates based on selected monomers of the type mentioned above. The binder component (b) is preferably formed by copolymers of (i) about 11 to 19 parts by weight of 2-hydroxyethyl(meth)acrylate, 2- or 3-hydroxypropyl(meth)acrylate and/or hydroxy butyl(meth)acrylate, (ii) about 60 to 75 parts by weight of methyl methacrylate, (iii) about 10 to 25 parts by weight of 2-ethylhexyl acrylate and (iv) about 0.5 to 1.5 parts by weight of (meth)acrylic acid, wherein preferably the sum of the parts by weight of (i) to (iv) amounts to 100.

The hydroxy alkyl (meth)acrylates (i) are used for introducing the isocyanate-reactive hydroxyl groups, the methyl methacrylate (ii) contributes towards increasing the glass transition temperature and hence towards increasing the hardness of the coatings according to the invention, the 2-ethylhexyl acrylate (iii) is used for elasticizing the resins while the acrylic acid or methacrylic acid (iv) may contribute towards increasing the reactivity of the copolymers.

The polyacrylate resins (b) used in accordance with the invention generally have an average molecular weight as determined by gel permeation chromatography ($M_{GPC}$) of from about 30,000 to 80,000 and preferably from about 40,000 to 70,000. The $M_{GPC}$-values may readily be calculated by the universal method developed by H. Benoit et al (Z. Grubisic, P. Rempp and H. Benoit, J. Polymer Sci. Part B, Polym. Lett. 5 (1967), page 753). Molecular weights $M_{GPC}$ below about 30,000 should be avoided because in combination with lacquer-grade polyisocyanates they may result in brittle, nonelastic lacquer films. This applies in particular where the polyisocyanates containing isocyanurate groups are used. Average molecular weights above about 80,000 are also unfavorable because in their case the solution viscosities become too high and the pot lives together with the polyisocyanate crosslinker are generally too short. In addition, the polyacrylates according to the invention should have a content of low molecular weight constituents of from about 3 to 15% by weight and preferably from about 5 to 10% by weight, based on the solid resin. The low molecular weight constituents in question have molecular weights of less than about 3000. This provides for a distinct improvement in compatibility between the acrylate resin and the cross-linking agent. By the presence of these compatibility-improving low molecular weight constituents, the molecular heterogeneity factor, $U = Mw/Mn - 1$, becomes relatively high lying in the range from about 1.0 to 10.0 and preferably in the range from about 2.0 to 6.0.

The solution viscosities of the about 50 to 55% by weight resin solutions are generally in the range from about 2000 to 30,000 mPa.s and preferably in the range from about 3000 to 10,000 mPa.s.

The heterogeneity of the chemical composition may be determined by sampling during the polymerization reaction and subsequently determining the composition by elemental analysis, by determination of the OH-number, etc. The chemical heterogeneity may also be characterized by precipitation fractionation, for example using the solvent/precipitant system of acetone/petroleum ether. The heterogeneity parameters $\delta_i$ calculated from the measured copolymerization parameters and also the experimentally observed heterogeneity parameters $\delta_i$ lie between 0 and about 0,06 and preferably between about 0.01 to 0.05. In this connection, the $\delta_i$-parameter is defined for each comonomer in the copolymer. $\delta_i$ is a measure of the dispersion and is defined in the literature (H.-G. Elias, Makromol. Chem. 104 (1967), page 142). The polyacrylate resins (b) used in accordance with the invention have OH-numbers in the range from about 40 to 90 mg of KOH/g of solid resin and preferably in the range from about 45 to 82. Their acid numbers are in the range from 0 to about 16 mg of KOH/g of solid resin and preferably in the range from about 3 to 12.

The polyacrylate resins thus-defined are produced by the known continuous polymerization process or, in particular, by the known monomer feed polymerization process. In the monomer feed process, all or part of the solvent or solvent mixture is generally first introduced into the reaction flask and heated to the reaction temperature, after which the monomer mixture is generally run-in uniformly and at the same time as the initiator. The stationary conditions that prevail in a continuous polymerization process generally do not prevail in the run-in process. It is only towards the end of the monomer feed process that, in many cases, substantially stationary conditions are established. On completion of the monomer feed process, the further course of the polymerization reaction is similar to that followed in the final stages of a batch polymerization process. In most cases, the monomer feed process is over at a conversion of around 80 to 95%, so that the batch phase is substantially negligible compared with the run-in phase. Although in general, chemically uniform copolymers are not formed in contrast to continuous polymerization, the chemical structure of the copolymers is generally much more regular than in the case of batch polymerization.

The polymerization velocity of the individual monomers and the decomposition rate of the initiators vary to different extents in the event of changes in temperature. Because of this, even relatively minor changes in temperature are sufficient to disturb the reaction conditions to a significant extent. Because of this, high temperature stability is required for all polymerization processes.

Suitable initiators for producing the polyacrylate resins are compounds of the type which decompose thermally into radicals in a reaction of the first order. The half-life values of the decomposition into radicals of suitable initiators should amount to between about 0.01 and 100 minutes at about 80° to 160° C. In general, the copolymerization reaction takes place at temperatures in the range just mentioned and preferably at temperatures in the range from about 100° to 160° C. under a pressure of from about $10^3$ to $2 \times 10^4$ mbars, the exact temperature depending upon the type of initiator used. The initiators are used in quantities of from about 0.05 to 3% by weight and preferably in quantities of from about 0.1 to 2% by weight, based on the total quantity of monomers. In general, at least about 98% of the monomers used are reacted.

Suitable initiators are, for example, symmetrical aliphatic azo compounds, such as azoisobutyronitrile, azobis-2-methyl valeronitrile, 1,1′-azo-bis-1-cyclohexane nitrile and 2,2′-azo-bis-isobutyric acid alkyl ester, symmetrical diacyl peroxides such as, for example, acetyl, propionyl or butyryl peroxide, benzoyl peroxides substituted by bromine atoms, nitro groups, methyl groups or methoxy groups and also lauroyl peroxide, symmetrical peroxy dicarbonates such as, for example, diethyl, diisopropyl, dicyclohexyl and dibenzyl peroxy dicarbonate, tert.-butyl perpivalate, tert.-butyl peroctoate or tert.-butyl phenyl peracetate as well as peroxy carbamates, such as tert.-butyl-N-(phenylperoxy)-carbamate or tert.-butyl-N-(2,3- or 4-chlorophenylperoxy)-carbamate. Other suitable peroxides are tert.-butyl hydroperoxide, di-tert.-butyl peroxide, cumene hydroperoxide, dicumyl peroxide.

Polymerization may be carried out either in solution or in bulk. As mentioned above, it is preferably carried out in solution. Suitable solvents are, for example, aromatic hydrocarbons such as benzene, toluene, xylene, chlorobenzene, esters such as butyl acetate, ethyl acetate, ethyl glycol acetate, methyl glycol acetate, ethers such as butyl glycol, tetrahydrofuran, dioxane, ethyl glycol ether, ketones such as acetone, methyl ethyl ketone, halogen-containing solvents, such as methylene chloride, trichloromonofluoroethane or mixtures of these solvents.

On completion of the copolymerization reaction, any traces of readily volatile monomers still left are generally removed by subjecting the copolymerization mixture to "mild distillation" so that most of the solvent remains in the reaction mixture which, as a result, accumulates in the form of a directly useable solution in the above-mentioned solvents.

It also follows from this that lacquer solvents are preferably used as the solvents. It is of course also possible to carry out the copolymerization reaction in the absence of solvents and subsequently to add solvent to the copolymer. On the other hand, the process according to the invention may also be carried out in the absence of solvents so that any solvent used during the copolymerization reaction has to be removed by distillation before the copolymers are used in accordance with the invention. In this case, it is of course advisable to carry out the actual production of the copolymers in the absence of solvents.

On completion of the polymerization, the copolymers may be modified by known methods, for example by reaction with glycidol or glycidol esters, carboxylic acid anhydrides, such as phthalic acid anhydride, by esterification or transesterification with carboxylic acids or carboxylic acid esters, such as benzoic acid, ethyl hexanoic acid, fatty acids or oleic acid. Certain properties, such as compatibility with pigments, adhesion and resistance to alkalis may be improved by this modification. However, the unmodified polyhydroxy polyacrylate resins are preferably used in the process according to the invention because combinations thereof with the above-mentioned lacquer-grade polyisocyanates show excellent pigment wettability, as reflected inter alia in the fact that the hardened lacquer films produced in accordance with the invention have a uniform, high-gloss surface.

In addition to the solvents already mentioned, the coating compositions used in accordance with the invention may contain other standard additives and auxiliaries of the type used in polyurethane lacquer technology, such as for example levelling agents based on cellulose esters, oligoalkyl acrylates, silicone oils, plasticizers, such as phosphoric acid esters, phthalic acid esters, pigments and fillers, viscosity-controlling additives, such as bentonites and silicic acid esters, delustring agents, hardening accelerators, such as manganese, lead or cobalt naphthenates and tin accelerators, calcium salts, bases, such as diazabicyclooctane, acids, such as phosphoric acid, ethanolic hydrochloric acid, tartaric acid or citric acid, in quantities of from about 0.1 to 30% by weight, based on the total quantity of coating composition.

The quantitative ratios between the individual constituents of the coating compositions used in accordance with the invention are selected in such a way that from about 0.2 to 5 and preferably from about 0.7 to 1.3 isocyanate groups are available for each hydroxyl group of the hydroxyl-group-containing components present in the reaction mixture. In principle, it is also possible to use the isocyanate component (a) in a form in which it is blocked with blocking agents for isocyanate groups, such as for example phenols, ε-caprolactam, malonic acid diethyl ester or acetoacetic acid ethyl ester, so that the coating compositions used in accordance with the invention are heat-crosslinkable stoving lacquers.

In the practical application of the process according to the invention, the coating compositions used in accordance with the invention may be applied to substrates of any type, such as for example metals, wood, masonry, concrete, glass, ceramics, plastics, textiles or paper, by any of the methods normally used in lacquer technology such as, for example, spray coating, spread coating, dip coating, casting or roll-coating. Wood is a particularly preferred substrate. The coating compositions used in accordance with the invention are distinguished by a long pot life, by very short drying times, even at temperatures in the range from 10° to 60° C., by good levelling, by color fidelity and clarity and by outstanding mechanical properties of the coatings obtained with them. Their excellent adhesion to iron and other metals, such as aluminum and zinc for example, and their good adhesion to plastics are outstanding features.

The invention is illustrated by the following Examples in which all the percentages quoted represent percentages by weight.

EXAMPLES 1 TO 4

(Production of polyacrylate resins suitable for use in accordance with the invention)

6130 g of xylene and 6520 g of ethyl glycol acetate (EGA), are introduced into and heated to 140° C. in an oxygen-free, 40-liter-capacity autoclave. The solutions having the compositions indicated in Table 1 are then uniformly added over a period of 4 hours at the above-mentioned temperature, which is kept constant, in the absence of air. 36 g of di-t-butyl peroxide in 387 g of xylene are added for reactivation. After stirring for 6 to 8 hours at 140° C., volatile residual monomers, particularly methyl methacrylate, and small quantities of the solvent mixture are subsequently removed by distillation in a water jet vacuum.

The physical-chemical properties of the acrylate resin solutions are also listed in Table 1.

TABLE 1

| Example No. | 1 | 2 | 3 | 4 |
|---|---|---|---|---|
| 2-hydroxyethyl methacrylate (g) | 2088 | 2088 | 2088 | 2088 |
| Methylmethacrylate (g) | 7839 | 8623 | 9015 | 9407 |
| 2-ethyl hexylacrylate (g) | 3005 | 2221 | 1829 | 1437 |
| Acrylic acid (g) | 132 | 132 | 132 | 132 |
| Di-t-butyl peroxide (g) | 93 | 93 | 133 | 200 |
| Conversion (% by weight) | 99.4 | 99.2 | 98.8 | 99.5 |
| Concentration (% by weight) | 54.6 | 52.8 | 52.3 | 51.9 |
| OH-number (mg of KOH/g of solution) | 38.9 | 37.7 | 34.3 | 34.8 |
| Acid number (mg of KOH/g of solution) | 4.9 | 4.6 | 5.6 | 4.8 |
| Viscosity (mPa.s) at 20° C. | 8900 | 15600 | 4500 | 5450 |
| Molecular weight $M_{GPC}$* | 47700 | 63500 | 45000 | 43000 |
| Estimated value for $U = \frac{Mw}{Mn} - 1$ | 4.1 | 3.9 | 3.7 | 3.8 |
| δ(hydroxy ethylmethacrylate) | 0.0324 | 0.0317 | 0.0313 | 0.0303 |
| δ(methylmethacrylate) | 0.0362 | 0.0376 | 0.0388 | 0.0334 |
| δ(ethylhexylacrylate) | 0.0254 | 0.0168 | 0.0109 | 0.0139 |

*as determined by GPC

The production of some coating compositions suitable for use in accordance with the invention and their use are described in the following. An acrylate resin according to German Offenlegungsschrift No. 2,460,329 was used for comparison. The following starting materials were used in the following Examples:

| | |
|---|---|
| acrylate resin 1 | corresponding to Example 1 |
| acrylate resin 2 | corresponding to Example 2 |
| acrylate resin 3 | corresponding to Example 3 |
| acrylate resin 4 | corresponding to Example 4 |
| acrylate resin 5 (comparison) | copolymer consisting of acrylic acid, 2-hydroxypropyl methacrylate, n-butyl acrylate, styrene and methyl methacrylate in the form of a 60% solution in xylene, OH-number: approx. 50 to 52, viscosity at 25° C.: approx. 2000 mPa.s |

Hardeners used in the following Examples:

Polyisocyanate I

A 50% by weight solution in butyl acetate of a polyisocyanate containing isocyanurate groups based on 2,4-diisocyanatotoluene produced in accordance with the Example 3 of U.S. Pat. No. 3,394,111. NCO-content: 8%.

Polyisocyanate II

A polyisocyanate containing isocyanurate groups based on 2,4-diisocyanatotoluene and hexamethylene diisocyanate (60% by weight solution in butyl acetate) produced in accordance with Example 1 of U.S. Pat. No. 3,645,979; NCO-content of the solution: 10.5%.

Polyisocyanate III

A 75% solution in ethyl acetate of a polyisocyanate containing urethane groups produced by reacting excess quantities of 2,4-diisocyanatotoluene with trimethylol propane and subsequently removing the excess diisocyanate by distillation. NCO-content of the solution: 13% by weight.

Polyisocyanate IV

A 75% by weight solution in xylene/ethyl glycol acetate (1:1) of a polyisocyanate containing biuret groups based on hexamethylene diisocyanate. NCO-content of the solution: 16.5%.

EXAMPLE 5

Compatibility of the acrylate resins with various cellulose derivatives:

A cellulose propionate (P) and a cellulose acetobutyrate (AB) are used as the cellulose derivatives. 20% by weight solutions thereof in acetone have viscosities in the range from 150 to 200 mPa.s (P) and in the range from 700 to 2000 mPa.s (AB). Acrylate resin 3 and the comparison resin (acrylate resin 5) were used in the form of the described solutions for the comparison test. The cellulose derivatives P and AB are used in the form of 17% solutions in methyl ethyl ketone. Compatibility is tested both in the solution (L) and also in the film (F). Ratio by weight of acrylate resin to cellulose derivative (solid:solid)

| | 10:1 | | 10:3 | | 10:5 | |
|---|---|---|---|---|---|---|
| | L | F | L | F | L | F |
| Acrylate resin 3 | | | | | | |
| with P | + | + | + | + | + | + |
| AB | + | + | + | + | + | + |
| Acrylate resin 5 | | | | | | |
| with P | − | − | + | − | + | − |
| AB | − | − | + | − | + | − |

Symbols of compatibility:
+: compatible;
−: incompatible

The lacquers described in the following Examples were clear lacquers having a solids content of 30% or 40%. They were additionally diluted with a mixture of xylene, ethyl glycol acetate, ethyl acetate and n-butylacetate in such quantitative ratios that the lacquer solutions contained the above-mentioned solvents in approximately equal parts by weight. The individual components were used in quantities corresponding to an NCO/OH-equivalent ratio of 1:1. It was only in the case of hardener I that the NCO/OH ratio amounted to 0.7:1. No other additives were introduced.

EXAMPLE 6

Compatibility of the acrylate resins in two-component lacquers with the various hardeners (polyisocyanates).

| Acrylate resin | Compatibility In the solution/film with hardener I | solution/film with hardener II | solution/film with hardener III | solution/film with hardener IV |
|---|---|---|---|---|
| 1 | +/+ | +/+ | +/+ | +/+ |
| 2 | +/+ | +/+ | +/+ | +/+ |
| 3 | +/+ | +/+ | +/+ | +/+ |
| 4 | +/+ | +/+ | +/+ | +/+ |
| 5 | =/= | =/= | −/+ | +/+ |

Compatibility symbols:
+ satisfactorily compatible
− incompatible; cloudy
= incompatible; heavily clouded/phase separation

EXAMPLE 7

Pot life and viscosity behavior of two-component lacquers of acrylate resins and the various hardeners.

| Acrylate resin | Pot life in hours | Flowout time (DIN-4-cup) in seconds after 0 h | 4 h | 8 h | 24 h |
|---|---|---|---|---|---|
| (a) with hardener I (solids content: 30%) | | | | | |
| 1 | ~20 | 18 | 23 | 33 | |
| 2 | ~20 | 19 | 26 | 38 | |
| 3 | ~27 | 17 | 19 | 22 | |
| 4 | ~24 | 20 | 22 | 25 | |
| 5 | * | * | * | * | |
| (b) with hardener II (solids content: 30%) | | | | | |
| 2 | ~20 | 17 | 22 | 31 | |
| 3 | ~24 | 15 | 16 | 17 | |
| 4 | ~20 | 18 | 21 | 25 | |
| 5 | * | * | * | * | |
| (c) with hardener III (solids content: 40%) | | | | | |
| 1 | ~28 | 42 | 52 | 62 | 265 |
| 2 | ~33 | 33 | 37 | 42 | 127 |
| 3 | ~40 | 25 | 26 | 30 | 59 |
| 4 | ~40 | 34 | 38 | 45 | 106 |
| 5 | ~48 | 16 | | 19 | |
| (d) with hardener IV (solids content: 40%) | | | | | |
| 2 | ~18 | 45 | 88 | 160 | |
| 3 | ~26 | 25 | 31 | 42 | |
| 4 | ~22 | 36 | 55 | 81 | |
| 5 | ~60 | 17 | | 18 | |

*cannot be measured because of incompatibility (see above)

EXAMPLE 8

Elasticity and pendulum hardness of two-component lacquers of acrylate resins and the various hardeners (same conditions as in Example 7).

| Acrylate resin | Indentation (Erichsen) after 14 d in mm | Pendulum Hardness (Konig) in seconds after 1 d | after 7 d | after 14 d |
|---|---|---|---|---|
| (a) with hardener I | | | | |
| 1 | 1.5 | 109 | 137 | 137 |
| 2 | 1.0 | 149 | 163 | 163 |
| 3 | 0.8 | 140 | 157 | 163 |
| 4 | 0.7 | 149 | 151 | 153 |
| 5 | * | * | * | * |
| (b) with hardener II | | | | |
| 2 | 8.0 | 150 | 150 | 160 |
| 3 | 8.2 | 141 | 153 | 161 |
| 4 | 8.3 | 158 | 160 | 160 |
| 5 | * | * | * | * |
| (c) with hardener III | | | | |
| 1 | 5.7 | 56 | 125 | 128 |
| 2 | 7.5 | 110 | 152 | 154 |
| 3 | 9.0 | 113 | 152 | 160 |
| 4 | 6.2 | 121 | 153 | 153 |
| 5 | 1.0 | 130 | 190 | 195 |
| (d) with hardener IV | | | | |
| 2 | 9.3 | 71 | 123 | 129 |
| 3 | 9.0 | 78 | 140 | 141 |
| 4 | 8.4 | 84 | 126 | 128 |
| 5 | 8.9 | 130 | 190 | 195 |

*cannot be measured because of incompatibility

EXAMPLE 9

Drying of two-component lacquers of acrylate resins and the various hardeners (H: handdrying, S: sand drying).

| Acrylate resin | Drying in mins. H | S |
|---|---|---|
| (a) with hardener I | | |
| 1 | 15 | 10 |
| 2 | 20 | 15 |
| 3 | 20 | 15 |
| 4 | 20 | 15 |
| 5 | * | * |
| (b) with hardener II | | |
| 2 | 30 | 15 |
| 3 | 35 | 15 |
| 4 | 25 | 15 |
| 5 | * | * |
| (c) with hardener III | | |
| 1 | 90 | 15 |
| 2 | 120 | 15 |
| 3 | 120 | 10 |
| 4 | 110 | 10 |
| 5 | 210 | 15 |
| (d) with hardener IV | | |
| 2 | 120 | 15 |
| 3 | 120 | 20 |
| 4 | 120 | 15 |
| 5 | 480 | 24 |

*cannot be measured because of incompatibility

EXAMPLE 10

Gloss behavior of a titanium-dioxide-pigmented two-component lacquer of acrylate resin 3 and the various hardeners in dependence upon the pigmenting level (parts by weight of pigment: 100 parts by weight of acrylate resin), gloss measured with a 60°-reflectometer according to DIN 67 530, NCO/OH=1.00.

| Pigmenting level, based on acrylate resin | 60° C.= Reflectometer value according to DIN 67530 after stoichiometric crosslinking with hardener I | hardener II | hardener III | hardener IV |
|---|---|---|---|---|
| 60 | 93 | 92 | 93 | 90 |
| 70 | 94 | 93 | 92 | 91 |
| 80 | 89 | 88 | 88 | 89 |
| 97 | 86 | 85 | 86 | 86 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a coated substrate which comprises
(A) coating said substrate with a coating composition which contains as binder a mixture comprising
   (a) a lacquer-grade polyisocyanate-containing biuret, urethane or isocyanurate groups and
   (b) a polyhydroxy polyacrylate resin based on a copolymer comprising
      (i) about 10 to 20 parts by weight of 2-hydroxyethyl(meth)-acrylate, 2- or 3-hydroxypropyl(meth)acrylate and/or hydroxybutyl(meth)acrylate,
      (ii) about 55 to 80 parts by weight of methyl methacrylate,
      (iii) about 8 to 30 parts by weight of 2-ethylhexyl acrylate and
      (iv) up to about 2 parts by weight of (meth)acrylic acid,
   wherein the polyhydroxy acrylate resin is further characterized by
      (1) an average molecular weight as determined by gel permeation chromatography, $M_{GPC}$, of about 30,000 to 80,000,
      (2) about 3 to 15% by weight, based on the total weight of the copolymer, of low molecular weight constituents having molecular weights of at most about 3,000,
      (3) a molecular heterogeneity factor, $U = Mw/Mn - 1$, of between about 1.0 and 10.0, and
      (4) a chemical heterogeneity parameter $\delta_i$ for the copolymer of between 0 and about 0.06, and
(B) hardening the coating composition to form a polyurethane coated substrate.

2. The process of claim 1 wherein the equivalent ratio of the isocyanate groups of component (a) and the isocyanate-reactive groups of component (b) is between about 0.2:1 and 5:1.

3. The process of claim 1 wherein the polyhydroxy polyacrylate resin is based on a copolymer comprising
   (i) about 11 to 19 parts by weight of 2-hydroxyethyl(meth)acrylate, 2- or 3-hydroxypropyl (meth)acrylate and/or hydroxybutyl(meth)acrylate,
   (ii) about 60 to 75 parts by weight of methyl methacrylate,
   (iii) about 10 to 25 parts by weight of 2-ethylhexyl acrylate and
   (iv) about 0.5 to 1.5 parts by weight of (meth)acrylic acid.

4. The process of claim 1, 2 or 3 wherein the polyhydroxy acrylate resin is further characterized by
   (1) an average molecular weight as determined by gel permeation chromatography, $M_{GPC}$, of about 40,000 to 70,000,
   (2) about 5 to 10% by weight, based on the total weight of the copolymer, of low molecular weight constituents having molecular weights of at most about 3,000,
   (3) a molecular heterogeneity factor, $U = Mw/Mn - 1$, of between 2.0 and 6.0, and
   (4) a chemical heterogeneity parameter $\delta_i$ for the copolymer of between about 0.01 and 0.05.

5. The process of claim 1, 2 or 3 wherein the isocyanate groups of component (a) are blocked with blocking agents for isocyanate groups.

6. The process of claim 4 wherein the isocyanate groups of component (a) are blocked with blocking agents for isocyanate groups.

7. The coated substrate prepared by the process of claim 1, 2 or 3.

8. The coated substrate prepared by the process of claim 4.

9. The coated substrate prepared by the process of claim 5.

10. The coated substrate prepared by the process of claim 6.

* * * * *